United States Patent
Doelker et al.

(10) Patent No.: US 12,286,255 B2
(45) Date of Patent: Apr. 29, 2025

(54) FORMING DEVICE AND METHOD FOR FORMING A CUP INTO A PACKAGING MATERIAL

(71) Applicant: KOCH Pac-Systeme GmbH, Pfalzgrafenweiler (DE)

(72) Inventors: Benjamin Doelker, Pfalzgrafenweiler (DE); Tobias Goettert, Pfalzgrafenweiler (DE); Dennis Weissert, Pfalzgrafenweiler (DE)

(73) Assignee: KOCH PAC-SYSTEME GMBH, Pfalzgrafenweiler (DE)

( * ) Notice: Subject to any disclaimer, the term of this patent is extended or adjusted under 35 U.S.C. 154(b) by 0 days.

(21) Appl. No.: 18/137,145

(22) Filed: Apr. 20, 2023

(65) Prior Publication Data

US 2023/0339632 A1     Oct. 26, 2023

(30) Foreign Application Priority Data

Apr. 21, 2022   (EP) .................................... 22169284

(51) Int. Cl.
| | |
|---|---|
| *B29C 51/08* | (2006.01) |
| *B65B 5/02* | (2006.01) |
| *B65B 5/04* | (2006.01) |
| *B65B 7/28* | (2006.01) |

(52) U.S. Cl.
CPC ................. *B65B 5/02* (2013.01); *B65B 5/04* (2013.01); *B65B 7/2878* (2013.01)

(58) Field of Classification Search
CPC ..... B31F 1/0077; B31B 50/592; B21D 22/22; B21D 24/04; B65B 47/06; B65B 5/02; B65B 7/2878
See application file for complete search history.

(56) References Cited

U.S. PATENT DOCUMENTS

| | | | | |
|---|---|---|---|---|
| 3,349,153 A | * | 10/1967 | Beck ....................... | B29C 51/08 |
| | | | | 264/550 |
| 3,894,896 A | * | 7/1975 | Watanabe ............... | B29C 51/14 |
| | | | | 156/212 |
| 4,773,182 A | * | 9/1988 | Weder ...................... | G09F 3/10 |
| | | | | 47/72 |

(Continued)

FOREIGN PATENT DOCUMENTS

| | | |
|---|---|---|
| CN | 110153256 B | 6/2020 |
| EP | 3140200 B1 | 4/2018 |

(Continued)

OTHER PUBLICATIONS

European Search Report dated Oct. 4, 2022.
2023-064708 Japanese Office Action, dated Aug. 27, 2024, Yoshihisa Iida.

*Primary Examiner* — Andrew M Tecco
(74) *Attorney, Agent, or Firm* — Dickinson Wright PLLC

(57) ABSTRACT

A forming device has a die with at least one recess, a punch for forming the packaging material into the recess, and a hold-down device. The hold-down device and the die receive the packaging material between them in a holding region. The die and the hold-down device each have a bearing surface with at least one opening, which is in fluid communication with a fluid source. An aerostatic bearing is formed between the packaging material and the hold-down device and between the packaging material and the die.

12 Claims, 3 Drawing Sheets

(56) References Cited

U.S. PATENT DOCUMENTS

| | | | | |
|---|---|---|---|---|
| 5,178,293 | A | 1/1993 | Suzuki et al. | |
| 5,193,265 | A * | 3/1993 | Muggli | B29C 51/262 |
| | | | | 156/212 |
| 5,755,129 | A * | 5/1998 | Yamasaki | B21D 37/18 |
| | | | | 72/350 |
| 5,985,187 | A * | 11/1999 | Weder | B29C 51/44 |
| | | | | 425/150 |
| 6,379,140 | B2 * | 4/2002 | Weder | B29C 51/082 |
| | | | | 425/150 |
| 11,065,666 | B2 * | 7/2021 | Ito | B21D 19/08 |
| 11,084,242 | B2 * | 8/2021 | Haug | B31B 50/592 |
| 2001/0001281 | A1 * | 5/2001 | Weder | B29C 51/082 |
| | | | | 425/135 |
| 2004/0232595 | A1 * | 11/2004 | Bartoli | B31F 1/0077 |
| | | | | 264/289.3 |
| 2017/0057678 | A1 * | 3/2017 | Hauptmann | B65B 47/04 |
| 2019/0016494 | A1 * | 1/2019 | Hölle | B65B 43/08 |
| 2020/0230683 | A1 * | 7/2020 | Ito | B21D 19/088 |

FOREIGN PATENT DOCUMENTS

| | | | |
|---|---|---|---|
| JP | S63-96062 | A | 4/1998 |
| JP | H08-309447 | A | 11/1998 |
| JP | 2000-271662 | A | 10/2000 |
| KR | 102296253 | B1 | 9/2021 |

* cited by examiner

FORMING DEVICE AND METHOD FOR FORMING A CUP INTO A PACKAGING MATERIAL

RELATED APPLICATIONS

The present disclosure claims priority to and the benefit of European Application 22 169 284.1, filed on Apr. 21, 2022 the entire contents of each of which is incorporated herein by reference.

FIELD

The present disclosure relates to a forming device and a method for forming at least one cup into a packaging material.

BACKGROUND

Packaging frequently has at least one cup, formed in a packaging material, for receiving a product, as is known, for example, from packaging for medical and pharmaceutical products or for food and nutritional supplements. Such packaging can be formed into the packaging material by forming the at least one cup by injection moulding or by deep drawing the at least one cup, for example.

In deep drawing, the tools used, in the form of a die and a hold-down device, are frequently heated, inter alia in order to reduce the friction between the packaging material and the tools and to counteract creasing in the packaging material. However, the heating of the tools can have a disadvantageous effect on the forming process and on the packaging material. The heating of the tools has a particularly disadvantageous effect in the case of fibre-based packaging materials since these are generally moistened to improve their deformability, and the additional heating can have a negative effect on the deformability of the packaging material.

BRIEF SUMMARY

It is therefore an object of the present disclosure to provide a forming device and a method for forming at least one cup into a packaging material which ensure good deformability of the packaging material without having a disadvantageous effect on the forming process and on the packaging material.

According to an aspect of the disclosure, a forming device for forming at least one cup into a packaging material comprises a die, which has at least one recess, a punch, which is configured to form the packaging material into the at least one recess of the die, and a hold-down device, wherein the hold-down device and the die are configured to receive the packaging material between them in a holding region that surrounds the at least one recess of the die. In the holding region, the die has a first bearing surface, which faces the hold-down device, and the hold-down device has, in the holding region, a second bearing surface, which faces the die. The first bearing surface has at least one first opening, preferably a plurality of first openings, wherein the at least one first opening is in fluid communication with a first fluid source. Alternatively or in addition, the second bearing surface has at least one second opening, preferably a plurality of second openings, wherein the at least one second opening is in fluid communication with the first or a second fluid source.

In this way, fluid supply between the first or second bearing surface and the packaging material is made possible, thereby enabling the packaging material to be supported aerostatically in the forming device. The contact and consequently the friction between the packaging material and the die or the hold-down device during forming, in particular during deep drawing, can thereby be reduced. The reduction in friction, in turn, has the effect that heating of the die and the hold-down device for this purpose is not necessary, and negative effects of the heat input on the packaging material and the forming process can be avoided. Continuous energy input into the die and the hold-down device for the purpose of heating them can be dispensed with, which is advantageous both from an economic and from an ecological point of view. In a preferred embodiment, the die and the hold-down device are therefore unheated.

Furthermore, the holding force acting on the packaging material by means of the die and the hold-down device can be increased on account of the reduced friction, thereby reducing creasing in the packaging material and increasing the quality of the packaging.

In principle, the forming device is configured for forming at least one cup. As a particular preference, forming is accomplished by deep drawing the packaging material. All the features and embodiments described herein therefore also relate, in particular, to the deep drawing of the packaging material, whereby the at least one cup is formed. However, other processes, such as, for example, press forming, can also be used.

The forming device can be configured for simultaneous forming of a plurality of cups into the packaging material. For this purpose, the at least one recess of the die can comprise a plurality of recesses. The forming device can comprise a plurality of punches, or the punch can have a plurality of projections, wherein each projection is configured for forming the packaging material into a respective recess of the plurality of recesses of the die. The hold-down device preferably surrounds each recess of the plurality of recesses of the die. The forming device is described below, by way of representative example, on the basis of one recess and one punch, although the features apply analogously to embodiments having a plurality of recesses, a plurality of punches or projections, and a corresponding hold-down device.

The packaging material can be formed by a material selected from a group comprising metal, for example aluminium, plastic, in particular thermoplastic, or fibre-based material, such as, for example, paper, cardboard or textile. The packaging material can consist entirely of the fibre-based packaging material or can have a coating, for example of plastic.

The packaging material is of substantially flat shape. The packaging material can be provided in the form of a web, that is to say as a packaging material web, or as a blank for in each case one package. Packaging material webs are particularly suitable in the case of film-type packaging materials.

By means of the at least one first opening or the at least one second opening, it is possible to supply fluid into the holding region between the die, the hold-down device and the packaging material. The fluid is preferably a gas, particularly preferably air. The first and the second fluid source are preferably a compressed-air source which is configured to discharge pressurized air, that is to say compressed air.

The plurality of first openings can also be in fluid communication with a plurality of fluid sources, and the plurality of second openings can, independently thereof, be in fluid communication with a plurality of fluid sources, as described in more detail below with reference to a preferred embodiment. However, the first and the second fluid source can also be of integral structure.

The fluid supply in turn enables the formation of an aerostatic bearing. The die and/or the hold-down device are consequently configured to form an aerostatic bearing in the holding region. In general, the aerostatic bearing comprises a first bearing partner and a second bearing partner as well as an air cushion that separates the first and the second bearing partner from one another. The first bearing partner can be the die or the hold-down device. The second bearing partner is the packaging material.

According to another aspect of the disclosure, it also relates to a forming device with packaging material, wherein the die is configured to form a first aerostatic bearing between the die and the packaging material, and/or the hold-down device is configured to form a second aerostatic bearing between the hold-down device and the packaging material.

The die and the hold-down device cooperate in order to support and hold the packaging material, in particular in order to fix it during forming. In principle, the packaging material is preferably supported in a contact-free and thus friction-free manner by means of the aerostatic bearing. In a preferred embodiment, respective aerostatic bearings are formed between the die and the packaging material and between the hold-down device and the packaging material. The die, also called the drawing bushing, has the at least one recess. The at least one recess can be configured as a through-opening or can be trough-shaped, that is to say can have a base. The die can have a flange surrounding the at least one recess, which interacts with the hold-down device to hold the packaging material in the holding region. The first bearing surface preferably completely surrounds the at least one recess and is arranged in the holding region parallel to the packaging material. For example, the flange forms the first bearing surface. The die can have a radius between the first bearing surface and the at least one recess, in particular at a transition therebetween.

The hold-down device, also called a blank holder, preferably completely surrounds the punch. The hold-down device and the die can preferably be moved relative to each other in a stroke direction parallel to a movement direction of the punch. The second bearing surface is preferably arranged parallel to the first bearing surface. The second bearing surface preferably completely surrounds the punch and at least partially or completely coincides with the first bearing surface.

In the holding region, the packaging material is consequently received between the first and the second bearing surface. In the holding region, the hold-down device and the die exert a holding force on the packaging material which reduces or prevents creasing in the packaging material during forming.

The punch is provided for forming, in particular for deep drawing, the packaging material. The punch is preferably movable in the movement direction which is oriented substantially perpendicularly to the undeformed packaging material or to the first and second bearing surfaces. In this case, a free end of the punch engages the packaging material and pulls it into the at least one recess of the die. The free end of the punch and/or the at least one recess of the die therefore preferably have the shape of the cup to be formed.

The at least one cup is generally a depression or cavity in the packaging material, which is configured to receive at least one product. The size and shape of the at least one cup can be selected as desired, in particular taking into account the size and shape of the at least one product, and are not limited to specific sizes and shapes.

By means of the at least one first opening, a fluid, in particular air, can be passed between the first bearing surface and the packaging material in order to form the (first) aerostatic bearing. A first air cushion or a first air film is thereby formed between the first bearing surface and the packaging material, reducing the contact and the friction between the die and the packaging material. In order to apply fluid to the packaging material as uniformly and over as large an area as possible, the first bearing surface preferably has a plurality of corresponding first openings.

The at least one first opening can be formed, for example, by a slot, a bore or a pore. In one embodiment, the first bearing surface has a slot which preferably completely surrounds a respective recess, or has a plurality of slots which partially surround the respective recess. In addition or as an alternative, the first bearing surface can have a plurality of bores, which are preferably distributed around a respective recess.

In a particularly preferred embodiment, the die comprises a first bearing component, which has or surrounds the at least one recess and which has the first bearing surface. The first bearing component is formed at least partially from a porous material, in particular from a sintered material, which has the plurality of first openings. In this case, preferably at least the region of the first bearing surface is formed from the porous material. The porous material has a multiplicity of pores and thus a multiplicity of first openings, thereby allowing compressed-air distribution which is as uniform as possible and thus uniform formation of the (first) aerostatic bearing.

By means of the at least one second opening, a fluid, in particular air, can be passed between the second bearing surface and the packaging material in order to form the (second) aerostatic bearing. A second air cushion or a second air film is thereby formed between the second bearing surface and the packaging material, thereby reducing the contact and the friction between the hold-down device and the packaging material. In order to apply fluid to the packaging material as uniformly and over as large an area as possible, the second bearing surface preferably has a plurality of corresponding second openings.

The plurality of first openings and the plurality of second openings can also be in fluid communication with the same fluid or compressed-air source.

The at least one second opening can be formed, for example, by a slot, a bore or a pore. In one embodiment, the second bearing surface has a slot which preferably completely surrounds a respective recess, or has a plurality of slots which partially surround the respective recess. In addition or as an alternative, the second bearing surface can have a plurality of bores, which are preferably distributed around a respective recess.

In a particularly preferred embodiment, the hold-down device comprises a second bearing component, which surrounds the punch and has the second bearing surface. The second bearing component is formed at least partially from a porous material, in particular from a sintered material, which has the plurality of second openings. In this case, preferably at least the region of the second bearing surface is formed from the porous material. The porous material has a multiplicity of pores and thus a multiplicity of second openings, thereby allowing compressed-air distribution which is as uniform as possible and thus uniform formation of the (second) aerostatic bearing.

In order to be able to adapt the holding force acting on the packaging material locally to the stress of the packaging material during forming, it is preferred that the second bearing surface of the hold-down device has a plurality of segments, wherein a fluid supply at least to a first segment of the plurality of segments can be regulated independently of the fluid supply at least to a further segment of the plurality of segments. For example, the fluid supply at least to a first part of the plurality of segments can be regulatable independently of a fluid supply to a second part of the plurality of segments. In particular, the fluid supply to each segment of the plurality of segments can be individually regulatable. As a particular preference, the pressure at which the fluid is supplied is regulatable. Each segment of the plurality of segments can thereby be acted upon or operated at a certain pressure with fluid, for example with compressed air, which pressure can differ from the pressure at least of another segment. The fluid supply takes place via the fluid connection of the plurality of second openings to the fluid source.

The division of the second bearing surface into the plurality of segments can be accomplished structurally or functionally. Structural division is effected, for example, in that the second bearing component comprises a plurality of bearing elements which are each connected to a fluid source, wherein preferably each bearing element forms a segment of the plurality of segments. Functional division is effected, for example, in that a first part of the second openings is connected to the second fluid source and a second part of the second openings is connected to a further fluid source. Alternatively, the first and the second part of the second openings can be connected to the same fluid source, wherein a regulating device, such as a pressure-limiting valve, is provided in each case along the fluid connection of the first and the second part of the second openings to the fluid source. This can also apply to the plurality of bearing elements.

For example, a first pressure can be applied to a first segment of the plurality of segments and a second pressure, which preferably differs from the first pressure, can be applied to a second segment of the plurality of segments. The second pressure is preferably 2 times to 10 times, more preferably 3 times to 4 times, the first pressure. In one exemplary embodiment, the first pressure can be between 0.5 bar and 5 bar, preferably between 1 and 2 bar, and the second pressure can be between 5 and 10 bar, preferably between 6 and 8 bar. However, it is also conceivable for the first pressure to correspond to the second pressure.

In an analogous manner, the first bearing surface of the die preferably has a plurality of segments. All of the features described with respect to the plurality of segments of the second bearing surface can therefore be transferred analogously to the plurality of segments of the first bearing surface.

In principle, a first fluid flow, in particular a first air flow, can emerge from the at least one first opening and be directed onto the packaging material. A second fluid flow, in particular a second air flow, can emerge from the at least one second opening and can likewise be directed onto the packaging material.

In the deep drawing process, it may be desirable for more of the packaging material received between the die and the hold-down device to be able to be guided in the direction of the recess during deep drawing. The at least one first opening and the at least one second opening are therefore preferably configured in such a way that the respective first or second fluid flow emerging from them has a flow direction which is directed at least partially in the direction of the recess. That is to say that the respective flow direction at the exit from the at least one first or second opening has a directional component perpendicular to the first or second bearing surface and a directional component parallel to the first or second bearing surface in the direction of the recess.

According to another aspect of the disclosure, it also relates to a packaging machine having a forming device as described above. The packaging machine can be a blister machine, for example, wherein the forming device is configured for forming at least one blister cup into a forming film or a flat, fibre-based packaging material. The packaging machine can further comprise a filling station for filling the at least one cup with one or more products, and a closing device for closing the at least one filled cup. The closing device can be configured, for example, as a sealing station for sealing a cover material, such as, for example, a cover film, to the packaging material.

According to another aspect of the disclosure, a method for forming at least one cup into a packaging material by means of a forming device comprises the steps of:
  positioning the packaging material between a die and a hold-down device of the forming device;
  closing the forming device by a relative movement between the die and the hold-down device;
  forming an aerostatic bearing between the packaging material and the hold-down device and/or between the packaging material and the die; and
  forming the packaging material into at least one recess of the die by means of a punch of the forming device.

In this way, the packaging material is aerostatically supported in the forming device, thereby making it possible to reduce the contact and consequently the friction between the packaging material and the die or the hold-down device during forming. The reduction in friction, in turn, has the effect that heating of the die and the hold-down device for this purpose is not necessary, and negative effects of the heat input on the packaging material and the forming process can be avoided. Continuous energy input into the die and the hold-down device for the purpose of heating them can be dispensed with, which is advantageous both from an economic and from an ecological point of view. Furthermore, the holding force acting on the packaging material by means of the die and the hold-down device can be increased on account of the reduced friction, thereby reducing creasing in the packaging material and increasing the quality of the packaging.

The method is preferably carried out by means of the forming device or packaging machine described above. All of the features described with respect to the forming device and the packaging machine can therefore be transferred analogously to the method and vice versa.

The steps of the method are preferably carried out in the sequence indicated. Consequently, the forming device is closed when the packaging material is correctly positioned between the die and the hold-down device. The aerostatic bearing is preferably not formed until the forming device is closed. Once the aerostatic bearing has been formed, forming, in particular deep drawing, of the packaging material and thereby the forming of the at least one cup into the packaging material take place.

The method can be provided for simultaneously forming a plurality of cups into the packaging material and can include the step of forming the packaging material by means of the punch into a plurality of recesses of the die. Accordingly, the at least one recess of the die comprises a plurality of recesses. The forming device can comprise a plurality of punches, or the punch can have a plurality of projections, wherein each projection is configured for forming the packaging material into a respective recess of the plurality of recesses of the die. The hold-down device preferably surrounds each recess of the plurality of recesses of the die. The method is described below, by way of representative example, on the basis of one recess and one punch, although the features apply analogously to embodiments having a plurality of recesses, a plurality of punches or projections, and a corresponding hold-down device.

After forming, the aerostatic bearing can be deactivated, whereupon the forming device can be opened by a relative movement between the die and the hold-down device. The aerostatic bearing thus exists during the entire forming process, but preferably only as long as the forming device is closed.

The positioning of the packaging material between the die and the hold-down device can comprise the insertion of the packaging material into the forming device or the introduction or passage of a web-shaped packaging material into or through the forming device.

Closing the forming device preferably comprises moving the hold-down device in the direction of the die, in particular in a stroke direction parallel to the movement direction of the punch during forming. However, it is also possible for the die to be moved in the direction of the hold-down device, or the die and the hold-down device are moved towards one another.

The step of forming the packaging material preferably comprises moving the punch in the movement direction, which can be aligned perpendicularly to the substantially flat formation of the undeformed packaging material, engaging the packaging material with a free end of the punch, and drawing the engaged packaging material into the at least one recess of the die and thereby forming the packaging material in order to form the at least one cup.

During forming, the packaging material is stretched or compressed to different extents, particularly in the corner regions of the cup to be produced and in the regions adjacent thereto. During deep drawing, tensile and compressive stresses therefore arise in the packaging material. Owing to the compressive stresses, creases may form in the packaging material, particularly in the holding region between the hold-down device and the die. The creasing depends, inter alia, on the geometry of the cup to be formed, in particular on the size of the radii and the depth of the cup. On the basis of the geometry, therefore, it is possible to determine the creasing to be expected.

The creasing can be counteracted by the holding force which the hold-down device and the die exert on the packaging material in the holding region. The holding force corresponds to a normal force on the packaging material. This holding force, in turn, brings about a frictional force between the packaging material and the adjacent tools, that is to say the hold-down device and the die.

The aerostatic bearing preferably brings about the holding force on the packaging material and the resulting frictional force counteracts the tensile force in the material during deep drawing. It is therefore possible, depending on the creasing to be expected, to determine a required frictional force, based on which, in turn, the holding force required for this can be determined.

By virtue of the low coefficient of friction of the aerostatic bearing, the holding force can be significantly increased without exceeding the yield strength of the packaging material. As a result, cups with more complex geometries, in particular with tighter radii and/or greater depth, can be formed.

The method preferably further comprises the steps of:
determining the required frictional force in the holding region based on the geometry of the at least one cup;
determining the holding force based on the determined frictional force; and
forming the aerostatic bearing based on the determined holding force.

The frictional force produced by the holding force can be greater than the tensile force in order to hold the packaging material securely between the die and the hold-down device in the holding region. However, the frictional force can also be less than the tensile force in order to allow more of the packaging material to be guided in the direction of the recess during deep drawing. It is self-evident that the frictional force and the tensile force should be configured in such a way that forming of the packaging material and formation of the at least one cup take place.

The aerostatic bearing is preferably formed by means of a fluid, preferably by means of compressed air, which is passed between the packaging material and the die or between the packaging material and the hold-down device. The pressure of the fluid is preferably adjustable, thereby enabling the holding force exerted on the packaging material to be varied.

The formation of the aerostatic bearing can comprise the formation of the first and/or second aerostatic bearing, as described above in relation to the forming device. In principle, it is possible, in all the embodiments described herein, for only the first or only the second aerostatic bearing to be provided or for the first and the second aerostatic bearing to be provided. Unless otherwise described, all the embodiments of the aerostatic bearing apply both to the first and to the second aerostatic bearing. Conversely, it is always possible to provide just one aerostatic bearing, even if an embodiment comprising the first and the second aerostatic bearings is described.

With respect to the first aerostatic bearing, the formation of the aerostatic bearing comprises generating a first fluid cushion between the first bearing surface of the die and the packaging material. In addition or as an alternative, the formation of the second aerostatic bearing comprises generating a second fluid cushion between the second bearing surface of the hold-down device and the packaging material.

The generation of the first fluid cushion can, in turn, comprise supplying the fluid between the die and the packaging material via the first bearing surface, in particular by means of the at least one first opening. The generation of the second fluid cushion can, in turn, comprise supplying the fluid between the hold-down devices and the packaging material via the second bearing surface, in particular by means of the at least one second opening.

If the first bearing surface of the die has a plurality of segments, the formation of the (first) aerostatic bearing comprises the following steps:
discharging the fluid at a first pressure in a first segment of the plurality of segments; and
discharging the fluid at a second pressure in a second segment of the plurality of segments, wherein the first and second pressures differ.

If the second bearing surface of the hold-down device has a plurality of segments, the formation of the (second) aerostatic bearing comprises the following steps:
discharging the fluid at a first pressure in a first segment of the plurality of segments; and discharging the fluid at a second pressure in a second segment of the plurality of segments, wherein the first and second pressures differ.

The second pressure is preferably 2 times to 10 times, more preferably 3 times to 4 times, the first pressure.

If both the first and the second bearing surface have a plurality of segments, the first and the second pressure on the first bearing surface can differ from or correspond to the first and the second pressure on the second bearing surface. In the latter case, the pressures can also be referred to as first, second, third and fourth pressures.

In order to form the aerostatic bearing as described above by means of the fluid, a fluid flow is directed onto the packaging material. To be more precise, the formation of the first aerostatic bearing can comprise generating at least a first fluid flow which, starting from the die or the first bearing surface, is directed onto the packaging material and at least partially along the packaging material in the direction of the recess of the die. The formation of the second aerostatic bearing can comprise generating at least one second fluid flow which, starting from the hold-down device or the second bearing surface, is directed onto the packaging material and along the packaging material in the direction of the punch.

DETAILED DESCRIPTION

Figure 1:
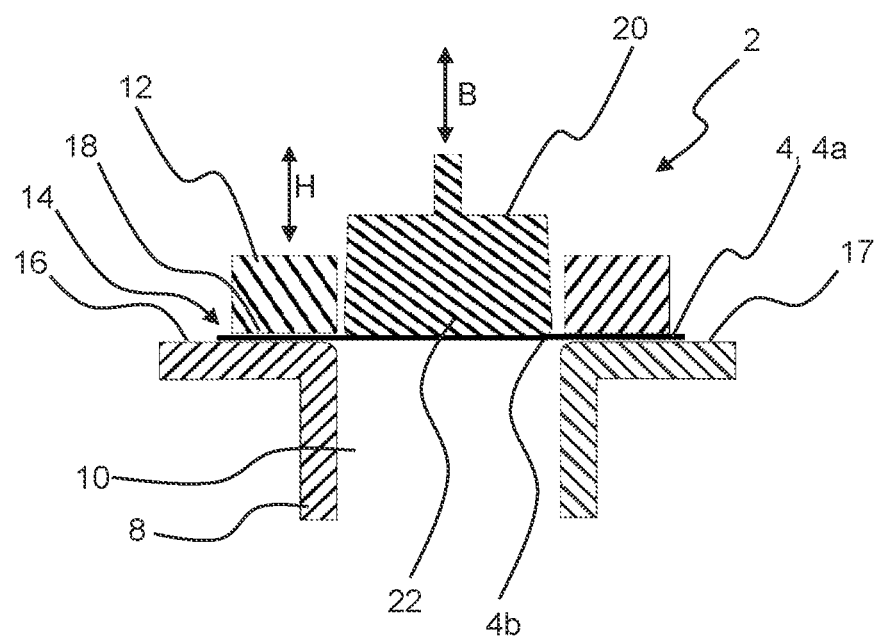
FIGS. 1 and 2 show a cross-sectional view of an embodiment of a forming device according to the disclosure with packaging material.
Figure 2:
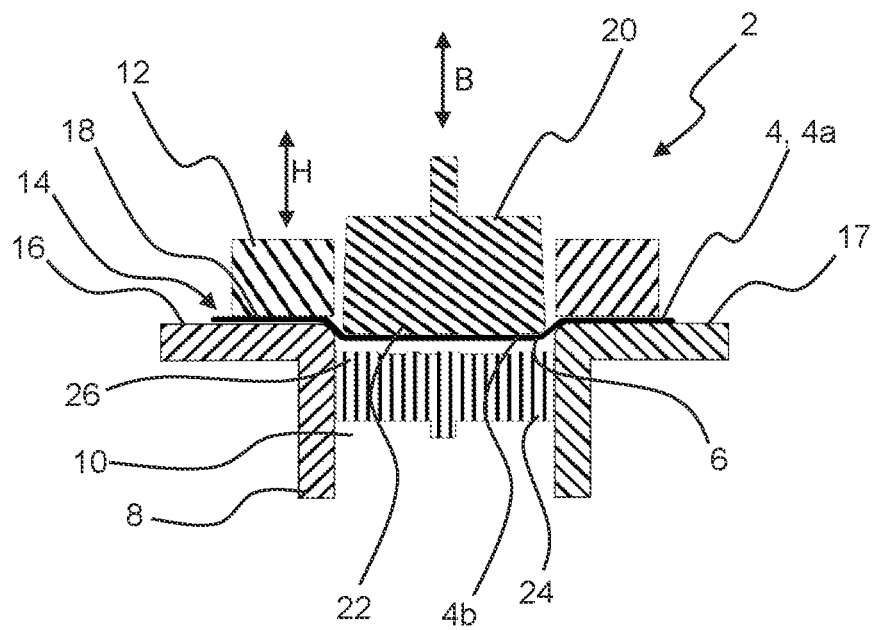

FIG. 1 and FIG. 2 each show a cross-sectional view of an embodiment of a forming device 2 according to the disclosure, wherein a packaging material 4 is inserted into the forming device 2. The packaging material 4 can be provided as a blank or as a packaging material web which extends through the forming device 2.

The forming device 2 is used to form at least one cup 6 into the packaging material 4, such as, for example, forming devices for the formation of blister cups in a forming film. For this purpose, the forming device 2 comprises a die 8, which has at least one recess 10. Furthermore, the forming device 2 comprises a hold-down device 12, wherein the hold-down device 12 and the die 8 receive the packaging material 4 between them in a holding region 14 which surrounds the recess 10. Analogously to the embodiment illustrated, the forming device 2 can comprise a die 8 having a plurality of recesses 10 for the formation of a plurality of cups.

The packaging material 4 is of substantially flat shape and has an upper side 4a and a lower side 4b. The die 8 has a first bearing surface 16, which faces the hold-down device 12 and the lower side 4b of the packaging material 4 and is formed, for example, by a flange 17 surrounding the recess 10 of the die 8. At the transition of the first bearing surface 16 to the recess 10, the die 8 has a radius 19 (see FIG. 3). The hold-down device 12 has a second bearing surface 18, which faces the die 8 and the upper side 4a of the packaging material 4. In the holding region 14, the packaging material 4 is consequently received between the first bearing surface 16 and the second bearing surface 18.

In order to introduce the packaging material 4 into the forming device 2 and to receive it between the die 8 and the hold-down device 12 in the holding region 14, the die 8 and the hold-down device 12 are movable relative to one another in a stroke direction H. The stroke direction H is preferably oriented perpendicularly to the upper side 4a of the undeformed packaging material 4 or perpendicularly to the first and the second bearing surface 16, 18.

For forming, for example for deep drawing, the packaging material 4 into the recess 10, the forming device 2 further comprises a punch 20, which is preferably movable in a movement direction B. The movement direction B is preferably oriented perpendicularly to the upper side 4a of the undeformed packaging material or perpendicularly to the first and the second bearing surface 16, 18. The punch 20 has a free end 22, which faces the packaging material 4 and impinges on the latter in order to form the packaging material 4.

The recess 10 can be formed in a trough or cup shape in the die 8 or, as shown, as a through-opening. A trough- or cup-shaped recess 10 would preferably have a shape corresponding to the cup to be produced, in particular would form a negative of the cup. Alternatively, for example, a counter-punch 24 can be provided which cooperates with the punch 20 to form the packaging material 4, as illustrated in FIG. 2. For the sake of greater clarity, the counter-punch 24 is illustrated at a short distance from the packaging material 4 in FIG. 2. The counter-punch 24 has a free end 26 which faces the lower side 4b of the packaging material 4.

In the holding region 14, the die 8 and the hold-down device 12 exert a holding force on the packaging material 4 in order to enable the forming of the packaging material 4 by the punch 20 and to prevent the formation of creases in the packaging material 4. To achieve this in conventional forming devices, the packaging material is mechanically clamped between the die and the hold-down device in the holding region.

In the forming device 2 under consideration, the die 8 and/or the hold-down device 12 are configured to form an aerostatic bearing in the holding region 14, as described below with reference to FIG. 3. By means of the aerostatic bearing, the packaging material 4 is supported on at least one side substantially without contact and thus without friction during forming.

In the embodiment illustrated, a first aerostatic bearing 28 is formed between the die 8 and the packaging material 4, and a second aerostatic bearing 30 is formed between the hold-down device 12 and the packaging material 4. The first and the second aerostatic bearing 28, 30 can be provided and designed independently of one another. In particular, it is also possible for only the first or the second aerostatic bearing 28, 30 to be provided.

Figure 3:
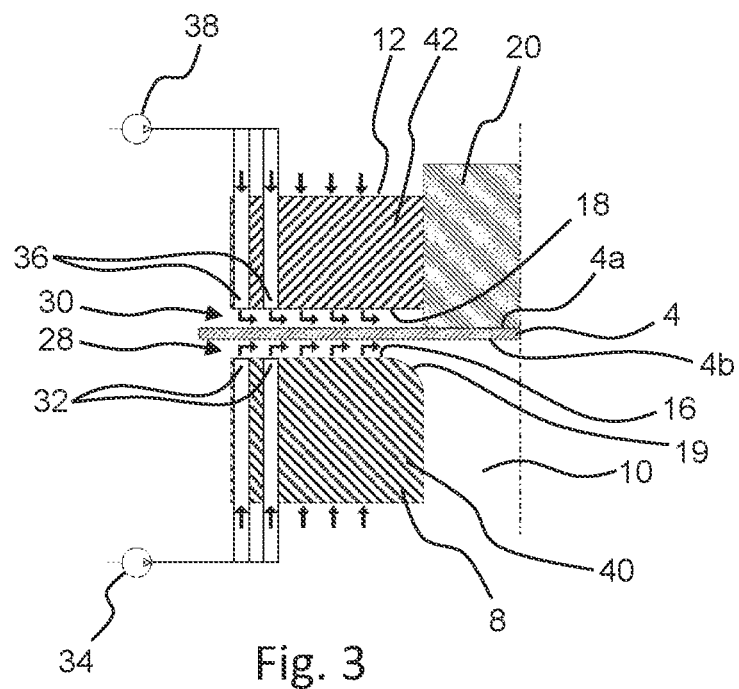
FIG. 3 shows a detail of the forming device according to FIGS. 1 and 2.

The first aerostatic bearing 28 comprises, for example, a first air cushion between the first bearing surface 16 and the packaging material 4, in particular the lower side 4b of the packaging material 4, which is indicated in FIG. 3 by the arrows between the first bearing surface 16 and the lower side 4b of the packaging material 4. In corresponding fashion, the second aerostatic bearing 30 can comprise a second air cushion between the second bearing surface 18 and the packaging material 4, in particular the upper side 4a of the packaging material 4, which is indicated in FIG. 3 by the arrows between the second bearing surface 18 and the upper side 4a of the packaging material 4.

The first and the second aerostatic bearing 28, 30 or the corresponding air cushions are produced by supplying a fluid, in particular compressed air, between the packaging material 4 and the die 8 or the hold-down device 12. In the following, a preferred embodiment is described in which the fluid is formed by air or compressed air. It is self-evident that other fluids, in particular gases, can also be used.

For supplying the fluid, the first bearing surface 16 of the die 8 has at least one and preferably, as illustrated, a plurality of first openings 32, which is in fluid communication with a first fluid or compressed-air source 34. The second bearing surface 18 of the hold-down device 12 has at least one and preferably, as illustrated, a plurality of second openings 36, which is in fluid communication with a second fluid or compressed-air source 38. By means of the plurality of first and second openings 32, 36, compressed air can be passed between the respective bearing surface 16, 18 and the packaging material 4 and distributed uniformly. The plurality of first openings 16 and the plurality of second openings 18 can be formed by bores in the die 8 or in the hold-down device 12. It is self-evident that in each case it is possible for just one first or second opening 32, 36 to be provided, which surrounds the recess 10, preferably completely. Such a first or second opening 32, 36 can be in the form of a slot in the respective bearing surface 16, 18, for example.

Alternatively, the illustrated first bearing component 40 of the die 8, which surrounds the recess 10 and has the first bearing surface 16, can be formed from a porous material, in particular from a sintered material, which has a multiplicity of pores which forms the plurality of first openings 32. Independently of this, the illustrated second bearing component 42 of the hold-down device 12, which surrounds the punch 20 and has the second bearing surface 18, can be formed from a porous material, in particular from a sintered material, which has a multiplicity of pores which forms the plurality of second openings 36.

A first air flow emerging from the plurality of first openings 32 and a second air flow emerging from the plurality of second openings 36 are basically directed onto the packaging material 4 in order to form the first and second aerostatic bearings 28, 30, respectively. If it is desired for more of the packaging material 4 to be guided into the recess 10 around the radius 19 during forming by the punch 20, the plurality of first and second openings 32, 36 can be configured in such a way that the first and the second air flow each have a flow direction which is directed at least partially in the direction of the recess 10, as illustrated in FIG. 3 by the arrows between the packaging material and the die 8 or the hold-down device 12.

Figure 4:
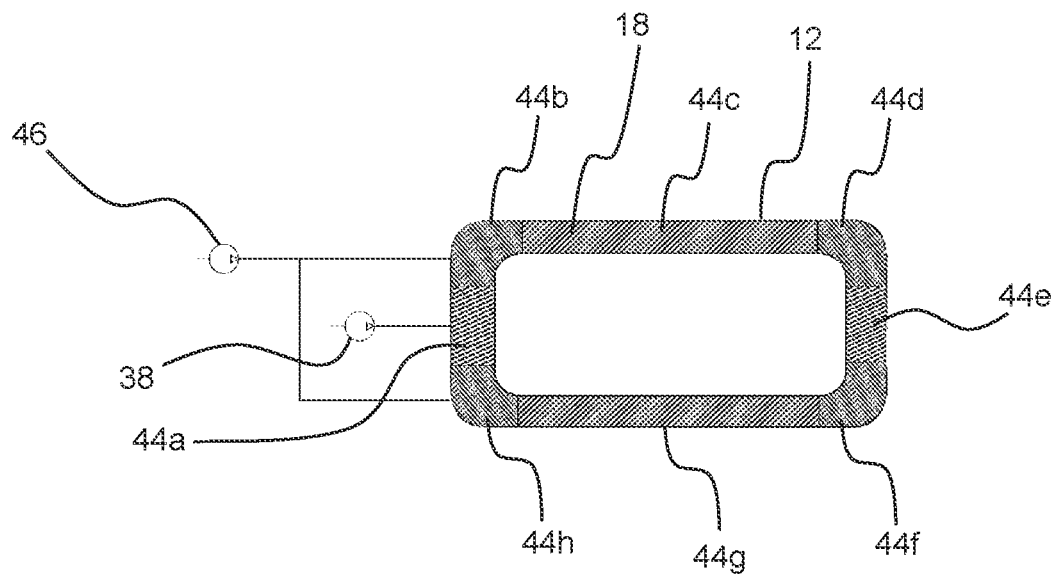
FIG. 4 shows a plan view of a bearing surface of a hold-down device or of a die of the forming device.

FIG. 4 illustrates a plan view of the second bearing surface 18 of the hold-down device 12. The second bearing surface 18 can have a plurality of segments 44*a*-44*h*, wherein preferably a fluid or compressed-air supply to at least a first part of the plurality of segments 44*a*-44*h* can be regulated independently of a fluid or compressed-air supply to a second part of the plurality of segments 44*a*-44*h*. This enables the pressure and thus the holding force acting on the packaging material 4 in the respective parts of the plurality of segments to be adjusted as required. For example, a first segment 44*a* of the second bearing surface 18 is connected to the second compressed-air source 38, as schematically indicated in FIG. 4. A second and a third segment 44*b* and 44*h*, which are adjacent to the first segment 44*a*, can be in fluid communication with a third compressed-air source 46, which can be regulated independently of the second compressed-air source 38. The second and the third segment 44*b*, 44*h* can be arranged in corner regions of the hold-down device 12 and of the recess 10 corresponding thereto. The first bearing surface 16 of the die 8 preferably has a plurality of segments in an analogous manner, and therefore the features described in relation to FIG. 4 apply analogously to the die 8.

Figure 5:
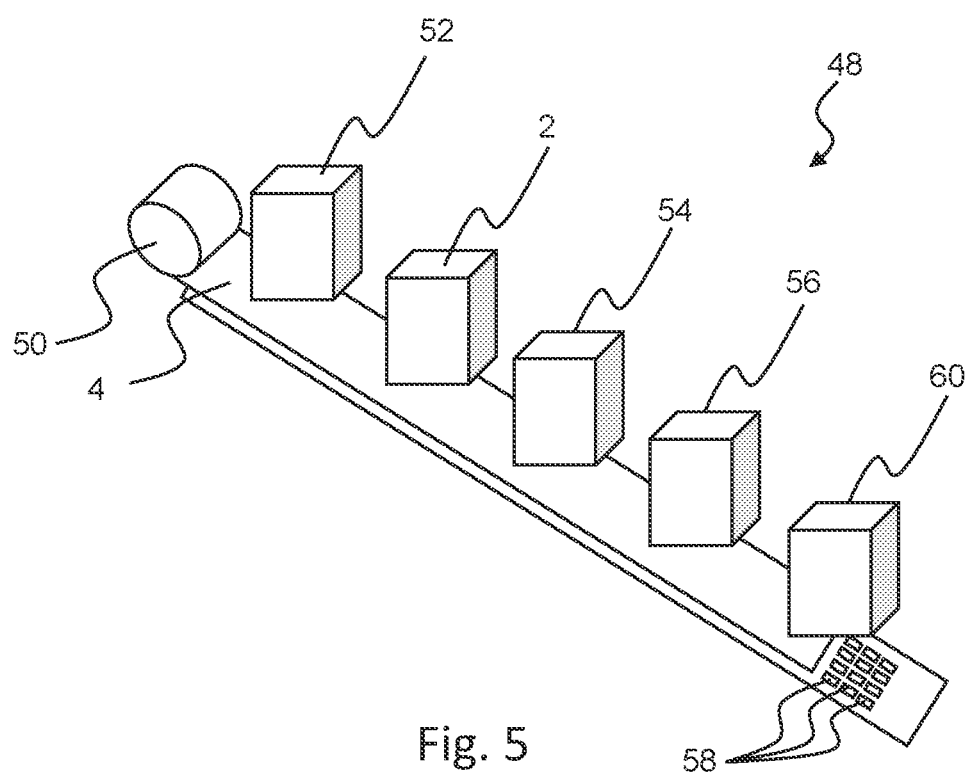
FIG. 5 schematically shows a packaging machine in a perspective view.

FIG. 5 schematically shows a packaging machine 48 in a perspective view. The packaging machine 48 comprises the forming device 2 as described above for forming at least one cup into the packaging material 4. In this case, the packaging material 4 is of substantially web-shaped design, is provided on a supply roll 50 and passes through a plurality of processing stations of the packaging machine 48, which are described in detail below. However, the packaging material 4 can also be provided as a flat blank, which is inserted into the individual processing stations.

The packaging machine 48 can further comprise a conditioning device 52. If the packaging material 4 is configured, for example, as a thermoplastic forming film, the conditioning device 52 can be a heating station which heats the packaging material 4. If, on the other hand, the packaging material 4 is a fibre-based packaging material, the conditioning device 52 can be configured, for example, for moistening the packaging material 4. The forming device 2 is preferably arranged downstream of the conditioning device 52.

Furthermore, the packaging machine 48 comprises a filling device 54 for filling at least one product into the at least one cup which has been formed in the packaging material 4 by the forming device 2. In order to close the at least one cup, which is filled with at least one product, the packaging machine 48 comprises a closing device 56, in which a cover material (not shown) is applied to the packaging material 4. The closing device 56 can be configured, for example, to adhesively bond or seal the cover material to the packaging material 4.

Particularly when a web-shaped packaging material 4 is used, there may be a desire to produce individual packages 58, each of which comprises at least one filled and closed cup. For this purpose, the packaging machine 48 optionally comprises a punching device 60, which is configured to punch or cut the individual packages 58 out of the packaging material 4, which is preferably already provided with the cover material.

In a particularly preferred embodiment, the packaging machine is configured as a blister machine which produces blister packs for medical or pharmaceutical products, consumer goods or cosmetic products or for food and nutritional supplements.

An exemplary embodiment of the method according to the disclosure is described below with reference to FIGS. 1 to 4.

First of all, the packaging material 4 is positioned between the die 8 and the hold-down device 12 of the forming device 2, as illustrated in FIG. 1. Preferably, the lower side 4*b* of the packaging material faces the die 8 and rests on the first bearing surface 16 of the die 8. The upper side 4*a* of the packaging material 4 consequently faces the hold-down device 12. The packaging material 4 covers the recess 10, preferably completely, i.e. rests on the flange 17 of the die 8 around the entire recess 10.

Once the packaging material has been positioned, the forming device 2 is closed by a relative movement between the die 8 and the hold-down device 12. In FIG. 1, the forming device 2 is shown in the closed state. By means of a relative movement between the die 8 and the hold-down device 12, for example by raising and lowering the hold-down device 12, parallel to the stroke direction H, the forming device 2 is opened and closed.

When the forming device 2 is closed, the first and the second aerostatic bearing 28, 30, which are illustrated in FIG. 3, can now be formed between the packaging material 4 and the hold-down device 12 or the die 8. For this purpose, fluid is passed between the first and second bearing surface 16, 18 and the packaging material 4. It is self-evident that even one of the first and second aerostatic bearings 28, 30 is advantageous and that not necessarily both aerostatic bearings 28, 30 are to be provided. By means of the aerostatic bearings 28, 30, a holding force is exerted on the packaging material 4 in the holding region 14 which surrounds the recess 10.

The packaging material 4 can then be formed into the recess 10 of the die 8 by means of the punch 20, as illustrated in FIG. 2. For this purpose, the punch 20 is moved in movement direction B and engages the packaging material 4 by means of the free end 22. The punch 20 pulls the packaging material 4 into the recess 10 and thereby forms the cup 6 in the packaging material 4.

The forces or stresses generated during the forming of the packaging material 4 can lead to creasing (in the case of compressive stresses) or tears (in the case of tensile stresses), especially in particularly stressed regions of the packaging material 4. This can be counteracted by means of the holding force. The method therefore preferably comprises determining the tensile force to be expected and determining the holding force based on the tensile force determined. The aerostatic bearings 28, 30 can then be formed based on the holding force determined. In particular, the holding force can be adjusted by adjusting the pressure of the compressed air supplied to form the aerostatic bearings 28, 30.

In order to increase the holding force in a targeted manner in particularly stressed regions of the packaging material 4, it is preferred that at least one of the first and second bearing surfaces 16, 18 and preferably both bearing surfaces 16, 18 have a plurality of segments 44, as illustrated in FIG. 4. The formation of the first or second aerostatic bearing 28, 30 can then comprise the discharge of compressed air at a first pressure in a first segment 44a of the plurality of segments 44 and the discharge of compressed air at a second pressure in at least one second segment 44b, 44h of the plurality of segments 44. In this case, the first and second pressures differ from one another.

The invention claimed is:

1. A forming device for forming at least one cup into a packaging material, wherein the forming device comprises:
   a die, which comprises at least one recess;
   a punch, which is configured to form the packaging material into the at least one recess of the die; and
   a hold-down device, wherein the hold-down device and the die are configured to receive the packaging material between them in a holding region that surrounds the at least one recess of the die;
   wherein the die has, in the holding region, a first bearing surface, which faces the hold-down device, and wherein the hold-down device has, in the holding region, a second bearing surface, which faces the die;
   wherein the first bearing surface has at least one first opening, wherein the at least one first opening is in fluid communication with a first fluid source, and/or the second bearing surface has at least one second opening, wherein the at least one second opening is in fluid communication with the first or a second fluid source; and
   wherein the first bearing surface has a plurality of first openings and the die comprises a first bearing component, which surrounds the at least one recess and comprises the first bearing surface, wherein the first bearing component is formed at least partially from a porous material which provides the plurality of first openings.

2. The forming device according to claim 1, wherein the second bearing surface has a plurality of second openings and the hold-down device comprises a second bearing component, which surrounds the punch and comprises the second bearing surface, wherein the second bearing component is formed at least partially from a porous material which provides the plurality of second openings.

3. The forming device according to claim 1, wherein the first bearing surface has a plurality of first openings and/or the second bearing surface has a plurality of second openings, wherein the plurality of first and/or second openings is formed by a plurality of bores.

4. The forming device according to claim 1, wherein the second bearing surface of the hold-down device has a plurality of segments, wherein a fluid supply at least to a first segment of the plurality of segments is regulatable independently of a fluid supply at least to a further segment of the plurality of segments.

5. The forming device according to claim 1, wherein the at least one second opening is configured in a way that a fluid flow emerging from it has a flow direction which is directed at least partially in the direction of the at least one recess.

6. The forming device according to claim 1, wherein the at least one first opening is configured in a way that a fluid flow emerging from it has a flow direction which is directed at least partially in the direction of the at least one recess.

7. A packaging machine comprising a forming device for forming at least one cup into a packaging material, a filling device for filling the at least one cup with a product, and a closing device for closing the at least one filled cup, wherein the forming device comprises:
   a die, which comprises at least one recess;
   a punch, which is configured to form the packaging material into the at least one recess of the die; and
   a hold-down device, wherein the hold-down device and the die are configured to receive the packaging material between them in a holding region that surrounds the at least one recess of the die;
   wherein the die has, in the holding region, a first bearing surface, which faces the hold-down device, and the hold-down device has, in the holding region, a second bearing surface, which faces the die;
   wherein the first bearing surface has at least one first opening, wherein the at least one first opening is in fluid communication with a first fluid source, and/or the second bearing surface has at least one second opening, wherein the at least one second opening is in fluid communication with the first or a second fluid source; and
   wherein the second bearing surface has a plurality of second openings and the hold-down device comprises a second bearing component, which surrounds the punch and comprises the second bearing surface, wherein the second bearing component is formed at least partially from a porous material which provides the plurality of second openings.

8. The forming device according to claim 7, wherein the first bearing surface has a plurality of first openings and the die comprises a first bearing component, which surrounds the at least one recess and comprises the first bearing surface, wherein the first bearing component is formed at least partially from a porous material which provides the plurality of first openings.

9. The forming device according to claim 7, wherein the first bearing surface has a plurality of first openings and/or the second bearing surface has a plurality of second openings, wherein the plurality of first and/or second openings is formed by a plurality of bores.

10. The forming device according to claim 7, wherein the second bearing surface of the hold-down device has a plurality of segments, wherein a fluid supply at least to a first segment of the plurality of segments is regulatable independently of a fluid supply at least to a further segment of the plurality of segments.

11. The forming device according to claim 7, wherein the at least one first opening is configured in a way that a fluid flow emerging from it has a flow direction which is directed at least partially in the direction of the at least one recess.

12. The forming device according to claim 7, wherein the at least one second opening is configured in a way that a fluid flow emerging from it has a flow direction which is directed at least partially in the direction of the at least one recess.

\* \* \* \* \*